Patented Sept. 20, 1932

1,878,510

UNITED STATES PATENT OFFICE

CHARLES MINDELEFF, OF JACKSON HEIGHTS, NEW YORK, ASSIGNOR TO LOUISE G. ROBINOVITCH, OF GOLDEN, COLORADO

CHLORINE PREPARATION

No Drawing. Application filed November 26, 1928, Serial No. 322,079. Renewed July 14, 1932.

This invention relates to the production of, and the method of producing, a new composition of matter, in solid form, as, for example, a powder, so that the active chlorine therein, in the predetermined form, as, for example, a hypochlorite, can be kept for considerable periods of time without suffering such deterioration as to lose efficiency, but which, when brought into mixture with an appropriate fluid, as, for example, water of acid reaction, will produce a practically clear fluid that will have a volume of active chlorine in the predetermined form, as, for example, a hypochlorite.

Efforts to produce compositions along these lines have been made for years, without success, until my discoveries became effective.

By a prior application, dated August 2, 1928, bearing Serial Number 297,375, I applied for Letters Patent for a preparation of a dry active chlorine compound soluble without reference to the necessity for a definite reaction by the solving agent.

The present invention relates to a composition that consists of an absorbent that holds the active chlorine preparation, as, for example, a sodium hypochlorite, with comparative stability, until the composition is placed in a proper fluid as, for example, water of acid reaction, when it goes into solution, and may be applied effectively for purposes in which active chlorine preparations of the type are useful. The acid reaction of the fluid may be created prior to the addition of my new composition, or my composition, when manufactured, may be made part of a mixture with a substantially dry acid, which will cause the solving fluid to become acid when the mixture is added to it, and have the desired effect on my new composition.

The comparative absence of chemical changes in connection with the use of an absorbent for holding active chlorine matter as above described makes the invention of high value and usefulness.

As applied, for example, to the manufacture of a dry hypochlorite, the complete process comprises the following steps:—

1. The absorption by a magnesium compound, as, for example, magnesium oxide, of an aqueous solution of a hypochlorite, as, for example, a sodium hypochlorite.

2. So governing and handling the process that the resultant product will be substantially dry. This provision contemplates care in adjusting the quantity of the active chlorine to be absorbed so that the resultant mass may not become soggy, and paying due attention to atmospheric conditions, for the same purpose. The atmosphere should have a low relative humidity, so that no moisture will be absorbed. If this is carefully done, drying as a separate process may be avoided. Otherwise, the product may be dried by any of the familiar methods for doing so, such as by passing dry air over the composition or by vacuum drying.

3. I prefer to prepare my composition for use by mixing in with it, when it is substantially dry, a predetermined quantity of a substantially dry acid, in solid or powder form, as, for example, citric acid, so that the resultant composition can be placed directly in a fluid, as, for example, water, which, thus obtaining an acid reaction, will cause my new composition to go into solution.

I have stated in detail the preferred practice of my composition, but it is to be understood that known chemical equivalents may be employed in place of the materials mentioned without departing from the spirit of the invention or the scope of the subjoined claims.

I claim:—

1. The method of producing an active chlorine preparation composition in solid or powder form which comprises the absorption of active chlorine matter by a magnesium compound capable of absorbing chlorine.

2. The method of producing a hypochlorite composition in solid or powder form which comprises the absorption of a hypochlorite compound by a magnesium compound capable of absorbing chlorine.

3. The method of producing an active chlorine composition in solid or powder form, which comprises the absorption of active chlorine matter by a magnesium oxide that is substantially dry.

4. The method of producing an active chlorine preparation composition in solid or powder form which comprises the absorption of active chlorine matter by a dry magnesium oxide, so governed and handled that the resultant product will be substantially dry.

5. The method of producing a hypochlorite composition in solid or powder form, which comprises the absorption of a hypochlorite compound by a magnesium oxide that is substantially dry.

6. The method of producing a hypochlorite composition in solid or powder form, which comprises the absorption of a hypochlorite compound by a magnesium oxide that is substantially dry, so governed and handled that the resultant product will be substantially dry.

7. A composition comprising a magnesium compound capable of absorbing chlorine that has absorbed a quantity of active chlorine matter, and which is substantially dry.

8. A composition comprising a magnesium compound capable of absorbing chlorine that has absorbed a quantity of a hypochlorite, and which is substantially dry.

9. A composition comprising a magnesium oxide that has absorbed a quantity of active chlorine matter, and which is substantially dry.

10. A composition comprising a magnesium oxide that has absorbed a quantity of a hypochlorite, and which is substantially dry.

11. A composition comprising a magnesium compound capable of absorbing chlorine that has absorbed a quantity of active chlorine matter, and which is substantially dry, and an acid that is substantially dry.

12. A composition comprising a magnesium compound capable of absorbing chlorine that has absorbed a quantity of a hypochlorite, and which is substantially dry, and an acid that is substantially dry.

13. A composition comprising a magnesium oxide that has absorbed a quantity of active chlorine matter, and which is substantially dry, and an acid that is substantially dry.

14. A composition comprising a magnesium oxide that has absorbed a quantity of a hypochlorite, and which is substantially dry, and an acid that is substantially dry.

15. The method of producing an active chlorine preparation composition in solid or powder form which consists in absorbing an aqueous solution of a chlorine liberating compound in a dry oxide of a metal of the alkaline earth group.

16. The method of producing an active chlorine preparation composition in solid or powder form which consists in absorbing an aqueous solution of a hypochlorite in a dry water-insoluble oxide of a metal of the alkaline earth group.

17. A chlorine liberating preparation in stable solid or powder form consisting of a dry water-insoluble oxide of a metal of the alkaline earth group permeated thruout with a soluble hypochlorite.

CHARLES MINDELEFF.